United States Patent

[11] 3,634,887

| [72] | Inventors | Donald E. Buchholz<br>Silver Spring;<br>Robert E. Miller, Ellicott City; Richard W. Pickering, Burtonsville; Douglas L. White, Silver Spring, all of Md. |
|---|---|---|
| [21] | Appl. No. | 844,820 |
| [22] | Filed | July 25, 1969 |
| [45] | Patented | Jan. 11, 1972 |
| [73] | Assignee | The United States of America as represented by the Secretary of the Navy |

[54] RADAR VIDEO RECORDER SYSTEM
20 Claims, 13 Drawing Figs.

| [52] | U.S. Cl. | 343/5 PC |
|---|---|---|
| [51] | Int. Cl. | G01s 9/02, G09b 9/00 |
| [50] | Field of Search | 343/5 PR; 35/10.4 |

[56] References Cited
UNITED STATES PATENTS

| 3,181,139 | 4/1965 | Milroy | 343/5 PR |
|---|---|---|---|
| 3,444,553 | 5/1969 | Tsumura et al. | 35/10.4 |

*Primary Examiner*—Malcolm F. Hubler
*Attorneys*—J. A. Cooke, R. S. Sciascia and R. J. Erickson ABSTRACT: A radar data recording system for recording, preserving, and replaying radar video, synchronizing pulses, and antenna position signals. The radar video, after modulation, and the synchronizing pulses are combined to form a radar composite signal and recorded on one track of a multiple track tape recorder. The angular position information is frequency converted by means of voltage-controlled oscillators and summed together to produce an FM antenna position composite signal. The FM signal is recorded on another track of said tape recorder. Upon playback the original radar video and synchronizing pulses are reconstructed from the radar composite signal through detector circuitry. Data discriminators in conjunction with drive servo circuitry reconstruct the angular position information from the FM carrier.

INVENTORS
DONALD E. BUCHHOLZ
ROBERT E. MILLER
RICHARD W. PICKERING
DOUGLAS L. WHITE

FIG. 4b

INVENTORS
DONALD E. BUCHHOLZ
ROBERT E. MILLER
RICHARD W. PICKERING
DOUGLAS L. WHITE
BY

FIG. 5

INVENTORS
DONALD E. BUCHHOLZ
ROBERT E. MILLER
RICHARD W. PICKERING
DOUGLAS L. WHITE

RADAR VIDEO RECORDER SYSTEM

BRIEF SUMMARY OF THE INVENTION

This invention relates to a system for faithfully reproducing radar display information without degradation of initial system qualities. More specifically, this radar data recording system is capable of recording, preserving, and replaying the video, synchronizing signals, and antenna position signals necessary to energize search radar plan position and range height indicator display consoles. This system can simultaneously accommodate one three-dimensional and one two-dimensional radar; and in addition can record coded time signals, voice annotation, and other radar system data.

In one preferred embodiment, the subject invention is utilized with a radar set having outputs of search video, trigger synchronizing pulses and angular position information, wherein all of these signals are applied to associated input circuitry. The input circuitry multiplexes all the input signals except the video and synchronizing pulses, by voltage-controlled oscillators. Since the search radar video signal can contain a large amount of low-frequency energy caused by clutter or jamming, it cannot be recorded directly by the tape recorder because of its low-frequency cutoff. For this reason the video signals are modulated by a high-frequency carrier before being recorded. This resultant signal is summed with the trigger synchronizing pulses to form a radar composite signal which is directly recorded by the video tape recorder. Upon playback, detectors, discriminators and the necessary electronic servo drive circuitry included in the output circuitry display a pattern which is essentially identical to the original display pattern.

It is therefore an object of this invention to provide a flexible and reliable recording system that will reproduce radar display information without degradation of initial signal qualities.

Another object of the invention is to provide a radar data recording system that can simultaneously accommodate a three-dimensional and a two-dimensional search radar.

As another object, the present invention provides means for acquiring live radar environmental data that is useful in the development of radar signal processing and simulation equipment.

Another object of the invention is to provide an effective data detection device for use during weapons systems tests.

Another object of the invention is to provide real time data keeping of raids, weather, and clutter appearing on the search radars during test and evaluation programs.

A still further object of the invention is to provide equipment that will enable training teams to analyze aircraft raids and to replay these same raids at various times and locations.

Another object of the invention is to provide a new and unique method of processing radar video and trigger synchronizing pulses to form a radar composite signal.

Still another object of the invention is to provide a novel method of processing and recording angular position information associated with radar video recording.

Other objects, features, and characteristics of the invention will become more apparent and discernible when reference is made to the detailed description and also to the accompanying drawings.

DETAILED DESCRIPTION OF THE INVENTION

Figure 1:
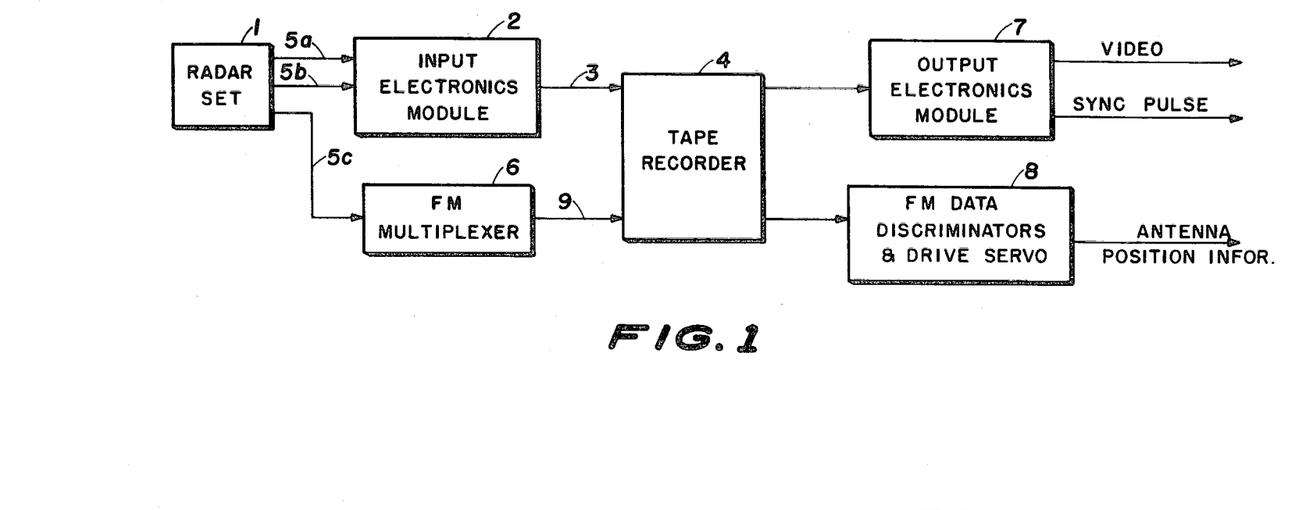
FIG. 1 is a simplified block diagram of the radar video recording system.

Referring now to FIG. 1, there is depicted the instant invention in its simplest embodiment which utilizes a radar 1 having outputs of video 5a, synchronizing pulses 5b and antenna position information 5c. The video 5a and synchronizing signals 5b are applied to an input electronics module 2 wherein said inputs are processed and summed forming a composite radar signal 3 which is applied to a multiple track tape recorder 4. The signals comprising the antenna position information 5c are fed into an FM multiplexer 6 forming an antenna position composite signal 9 and then appropriately recorded on the tape recorder 4. Upon playback of said tape recorder 4, the original video and synchronizing pulses are reconstructed by output electronics module 7 and the antenna position information by FM data discriminators and drive servo circuitry 8.

Figure 2A:
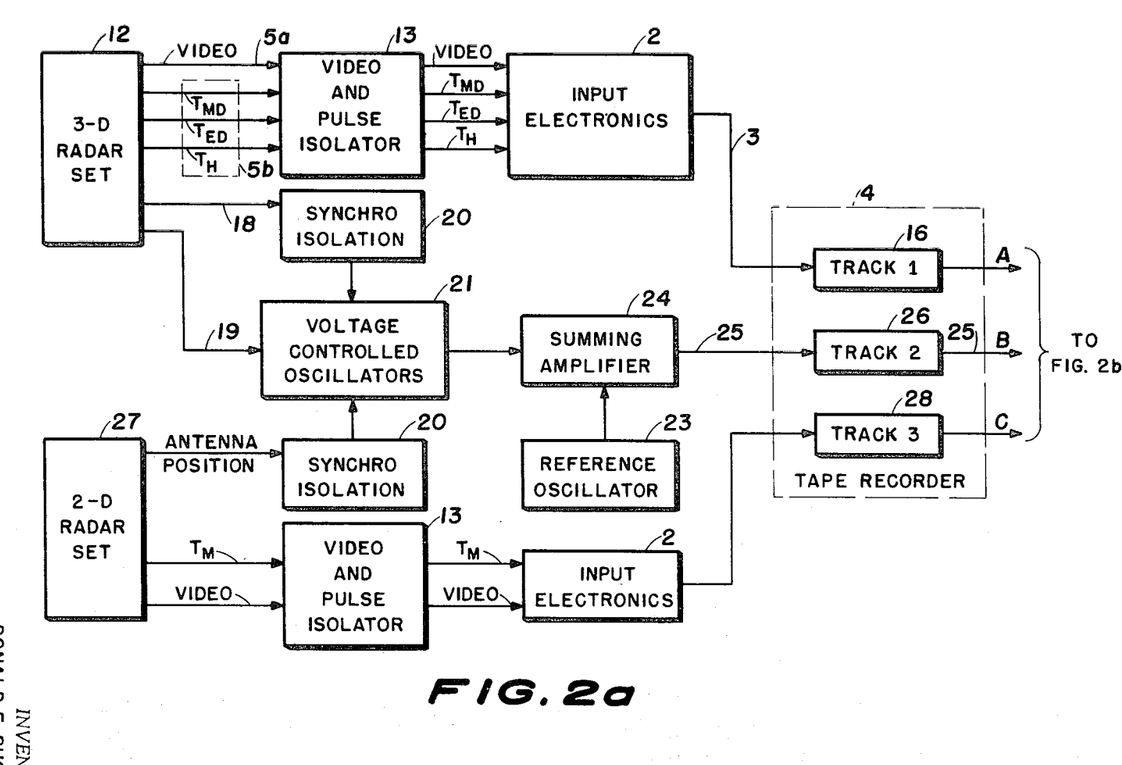
FIGS. 2a and 2b depict a detailed functional block diagram of the radar video recording system in a particular embodiment which utilizes both a three-dimensional radar and a two-dimensional radar.
Figure 2B:
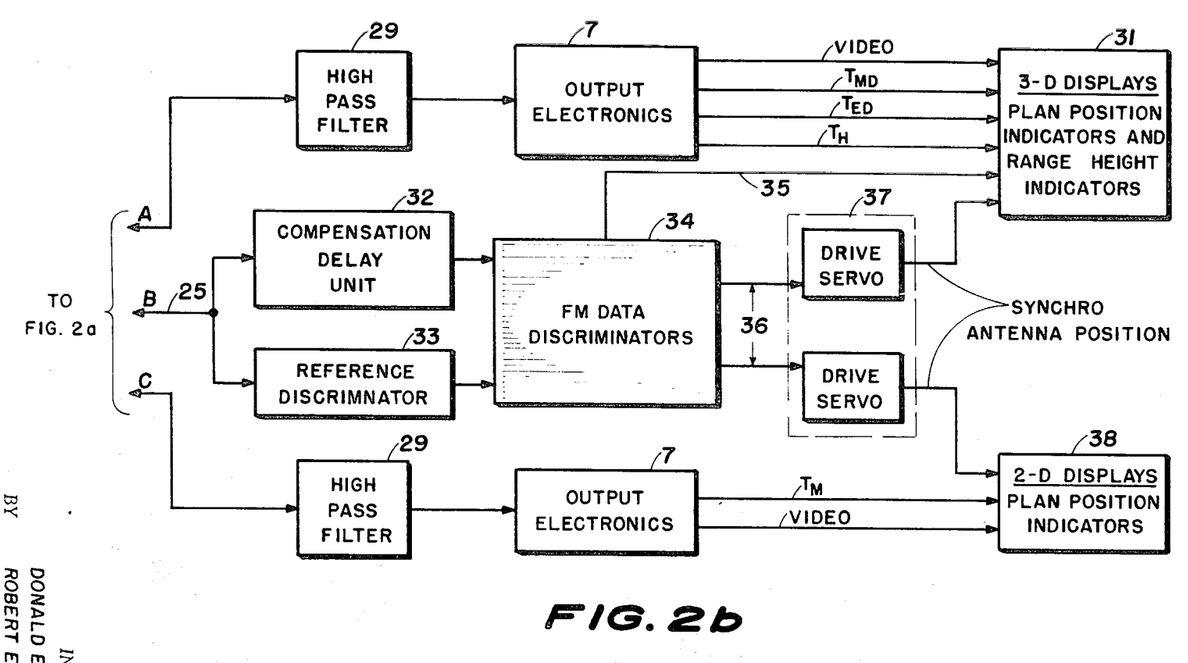

Referring now to FIG. 2, the video 5a and synchronizing pulses 5b (which include the master, early, and horizontal trigger pulses) from the three-dimensional radar receiver 12 are applied to conditioning means in the form of pulse and video isolators 13 which prevent radar loading. The video and synchronizing pulses are then applied to the electronics module 2 wherein the video signal is modulated with a high-frequency carrier to provide a frequency response to DC thus achieving capability with tape recorder bandwidth requirements. The resultant modulated video and the synchronizing pulses are summed to form the radar composite signal 3 which is then applied to one track 16 of the multiple track tape recorder 4.

Additionally, synchro antenna position signals 18 and scalar antenna position data 19 are also obtained from the three-dimensional radar 12. The synchro antenna position signals 18, which define the target position in terms of polar coordinates, are applied to a synchro isolation module 20 wherein is converted the synchro information (which is in the form of a five-wire line) into a reference signal and a phase-modulated signal suitable for modulating voltage-controlled oscillators 21. The scalar antenna position data 19, which defines the target position in terms of rectangular data, are applied directly to said voltage-controlled oscillators 21 wherein is produced an output frequency proportional to the input voltage magnitude. The outputs of the voltage-controlled oscillators 21 and the reference oscillator 23, which provides a constant frequency reference signal for tape flutter compensation, are applied to a summing amplifier 24 where they are multiplexed and amplified, yielding a composite output signal 25. The resultant FM antenna position composite signal is applied to another track 26 of said multiple track tape recorder 4.

As the signals from the two-dimensional radar 27 are processed in the same manner as the three-dimensional signals, no detailed discussion will be necessary. The only deviation from the three-dimensional scheme is that since the two-dimensional signals are for display of plan position indicator information only, fewer synchronizing pulses and antenna position inputs are needed. The processed signals of the two-dimensional set 27 are recorded on yet another track 28 of tape recorder 4.

The tape recorder 4 is a four-track, direct record, playback machine as commonly utilized in the art. For playback, the tape recorder output signals from the three-dimensional track 16 and the two-dimensional track 28 are applied to high-pass filters 29 having specified corner frequencies. This filtering removes low-frequency noise which might interfere with the detection of the synchronizing pulses. An output electronics module 7 detects and regenerates the synchronizing triggers and further detects the modulated video signal. The video and synchronizing outputs from the output electronics module 7 are fed to the plan position indicators and/or the range height indicator display consoles 31.

The multiplexed signal 25 from the tape recorder 4 is corrected for tape flutter by means of a compensation delay unit 2 and a reference discriminator 33. The reference discriminator 33 extracts flutter from the reference signal and converts it to a DC voltage which is used to modify the operating point of the FM data discriminators 34. The compensation delay unit 32 compensates for the inherent delay of the reference discriminator 33 and establishes the proper time relationships between the data signal and the flutter compensation signal. Thus, the effects of flutter are reduced in the system's output. The data discriminators 34 detect the multiplex signal 25 and generate an output voltage whose amplitude is linearly proportional to the frequency of the modulated carrier signal. The scalar antenna position outputs 35 from the data discriminators 34 are routed to the respective three-dimensional display consoles 31. The reference and phase modulated output signals 36 from the other data discriminators are applied to the drive servo units 37 which reproduce the angular position of the radar antenna in the form of the original five-wire synchro antenna position signal. The output element in each drive servo unit is a synchro generator which is capable of driving many plan position indicator display consoles. The outputs from the servo units are applied to either the two-dimensional (38) or the three-dimensional (31) plan position indicator display consoles.

Figure 3:
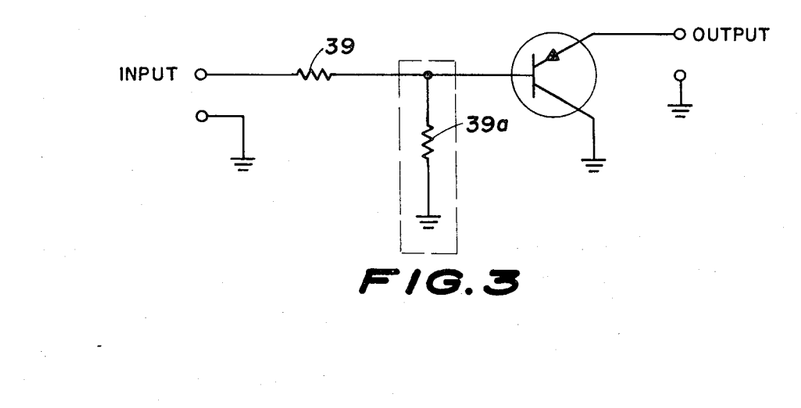
FIG. 3 is a schematic of a typical video isolator.

The video as it is picked up from the radar set is isolated from the rest of the recording system by a video isolator, as shown schematically in FIG. 3. This isolating circuit is basically an emitter-follower circuit wherein resistor 39 determines the amount of line impedance. The video isolator allows for location of the recorder 4 up to 1,000 feet from the video source without affecting the impedance of the normal transmission path. Thus any undesirable radar loading to the rest of the circuitry is prevented. The pulse isolators function in the same manner as said video isolators and the circuit construction involved therein is the same with the exception that an additional resistor 39a is placed in electrical parallelism with resistor 39 and ground as depicted within the dotted lines.

Figure 4A:
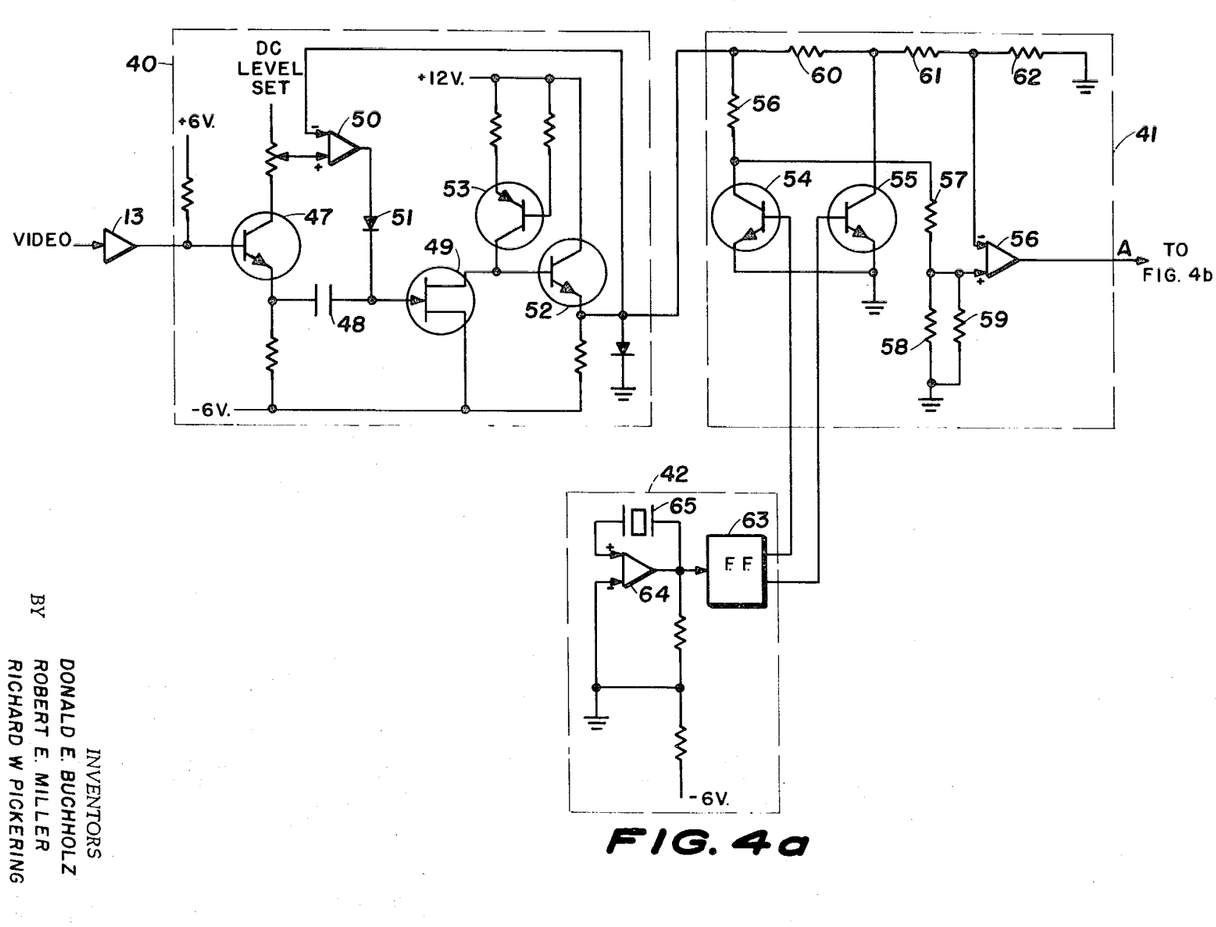
FIGS. 4a and 4b depict a blocked schematic diagram of the input electronics module.
Figure 4B:
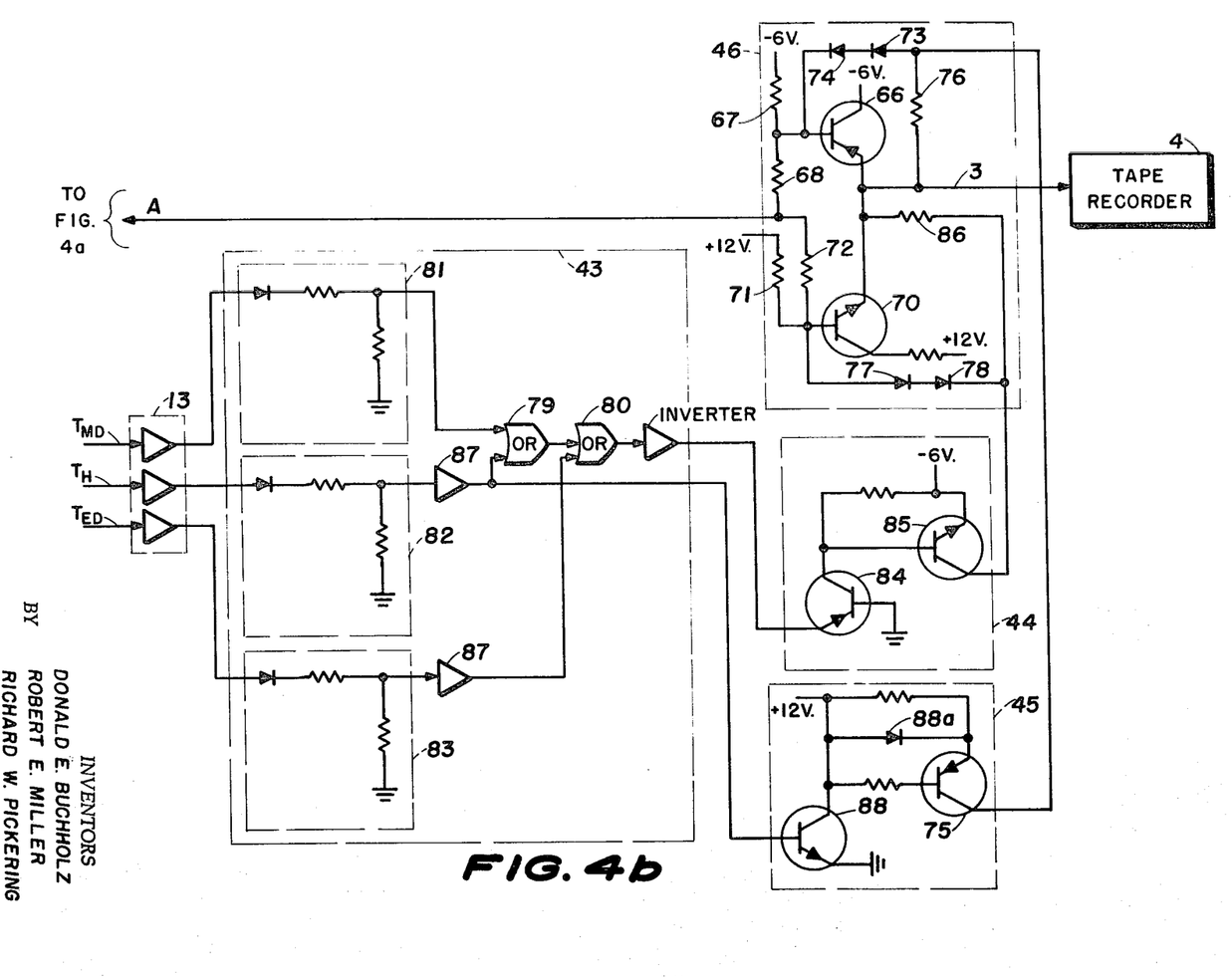

Referring now to FIG. 4, there is depicted a blocked schematic diagram of the input electronics which processes and forms the radar video and synchronizing pulses and produces a composite signal suitable for recording on the tape recorder. A detailed description of the circuitry is given below in two parts: (1) the video channel and (2) the synchronizing triggers.

VIDEO CHANNEL

The radar video can contain a large amount of low-frequency energy due to clutter or jamming. This information cannot be recorded directly on the tape recorder because of its low-frequency cutoff. For this reason the video frequencies are modulated by a higher frequency carrier, for example, a 1 MHz. carrier, before recording on the magnetic tape. The action of the fixed baseline amplifier 40 is to remove any low voltage variations in the radar video baseline, thus providing chopper modulator 41 with a fixed baseline. The emitter follower 47 isolates baseline amplifier 40 from the transmission line impedance which varies with line length. A capacitor 48 removes the average value of the radar video and couples the signal to the input of a high impedance field effect transistor source-follower amplifier 49. At this point, a voltage from a feedback regulator 50 is added to the video signal by a diode 51, with a magnitude such that the combined signal will have a fixed baseline at the output of a transistor 52. The regulator 50 amplifies the difference in voltage between the fixed baseline video and a DC level-set voltage. The source-follower amplifier 49 output is coupled to the low impedance of chopper modulator 41 and regulator 50, by emitter-follower transistor 52. To provide a gain approaching unity and to provide high-frequency response, the source follower 49 is biased by a high impedance current source 53.

During a baseline period, the output of regulator 50 is a positive voltage of a magnitude such that the input voltage to the modulator is equal to the voltage set by the DC level-set control. During the video period, the output of the regulator 50 will be negative and blocked from adding to the video by the diode 51. During periods of large energy video, such as jamming, capacitor 48 will charge slightly, providing some attenuation to the output. When this large energy signal is removed, during the radar blanking period, the charge buildup on capacitor 48 will cause the output baseline to fall below the level-set voltage. Regulator 50 will amplify this error and provide rapid discharge of capacitor 48 through its low impedance output.

Another feature of regulator 50 is to reduce by 95 percent any bias variations in diode 51 and in transistors 49 and 52. Without this reduction the baseline would vary significantly with temperature.

Chopper modulator 41 consists of a single-pole double-throw chopper, formed by transistors 54 and 55, and an integrated operational amplifier 56. Modulation is effected by alternately applying the video by ±1 volt at a specified high-frequency rate, for example, 1 MHz. The video, in passing through the modulator 41, has two parallel paths. One path is through the attenuator as formed by resistors 56, 57 58 and 59 and then into the noninverted input of amplifier 56. The second path is through the attenuator formed by resistors 60, 61, 62 and then into the inverting input of amplifier 56. The output of amplifier 56 is the sum of the two paths and its magnitude has a peak value equal to the input video.

High-frequency oscillator 42 (for example 2 MHz.) and a divide-by-two flip-flop 63 provide the required symmetrical switching source for chopper transistors 54 and 55. The oscillator 42 uses a high gain amplifier 64 and a series resonant crystal 65 to provide a square wave to the countdown flip-flop 63.

The output of chopper modulator 41 is coupled to the output by a complementary emitter-follower circuit essentially comprising transistors 66 and 70. Transistor 66 is biased on by resistors 67 and 68, and transistor 70 is biased on by resistors 71 and 72. Positive voltage excursions are provided a low impedance output by transistor 70, whereas transistor 66 provides the low impedance output for negative voltages. Diodes 73 and 74 provide the mechanism for removing the modulated video from the output for the duration of a positive synchronizing pulse. Transistor 75 of positive pulse amplifier 45 provides a +6 volts pulse at this time which conducts through the diodes and resistor 76 and the load impedance, providing potentials of +3 volts at the output and +4.8 volts at transistor 66 base. Thus transistors 66 and 70 are turned off since the peak voltage out of the modulator is ±2 volts. In a similar fashion, diodes 77 and 78 block the modulating video during a negative synchronizing pulse output.

SYNCHRONIZING TRIGGERS

The synchronizing trigger pulses, consisting of the early trigger—$T_{ed}$, the master trigger—$T_{md}$, and the horizon trigger—$T_h$, are summed with the modulated video. The early trigger $T_{ed}$ is used to terminate the sweep on the radar indicators. The radar master trigger $T_{md}$ is used to initiate the indicator sweep. The horizon trigger $T_h$ is used to start the timing circuits which generate range and height marks in display consoles. The horizon trigger pulse coincides with the master trigger pulse, occurring at a point where the elevation beam is at 0°. The master and early trigger pulses are applied to the summing amplifier 46 as negative pulses whereas the horizon trigger pulses are positively applied. Before the pulses from the isolators 13 are applied to OR-logic gates 79 and 80 they are passed through diode-resistor networks 81, 82 and 83 to ensure that the low-voltage level is less than a specified value.

The master trigger pulses combined with the early trigger pulses are applied to negative pulse amplifier 44. The pulse output of logic gate 80 is translated down to the −6-volt level by common base amplifier 84. The voltage at the emitter of transistor 84 will be clamped to a specified value by the base. This voltage level allows a specified current to be drawn from gate 80 and passed into the base of transistor 85, saturating this transistor. The collector of transistor 84 is then clamped to a negative value by transistor 85. The collector current of transistor 85 flows through resistor 86 and the load resistance, thereby giving a negative pulse output. The horizon trigger pulses are basically accorded the same treatment by positive pulse amplifier 45 in that the pulse output of amplifier 87 is amplified by two common-emitter amplifiers 88 and 75, which provide positive current through resistor 76. Diode 88a is used to prevent breakdown of the base-emitter junction of transistor 75.

In summing amplifier 46 the trigger synchronizing pulses and the modulated videos are summed into a radar composite signal 3 and therein applied to a first track 16 of multiple track tape recorder 4.

VIDEO DETECTION

Figure 5:
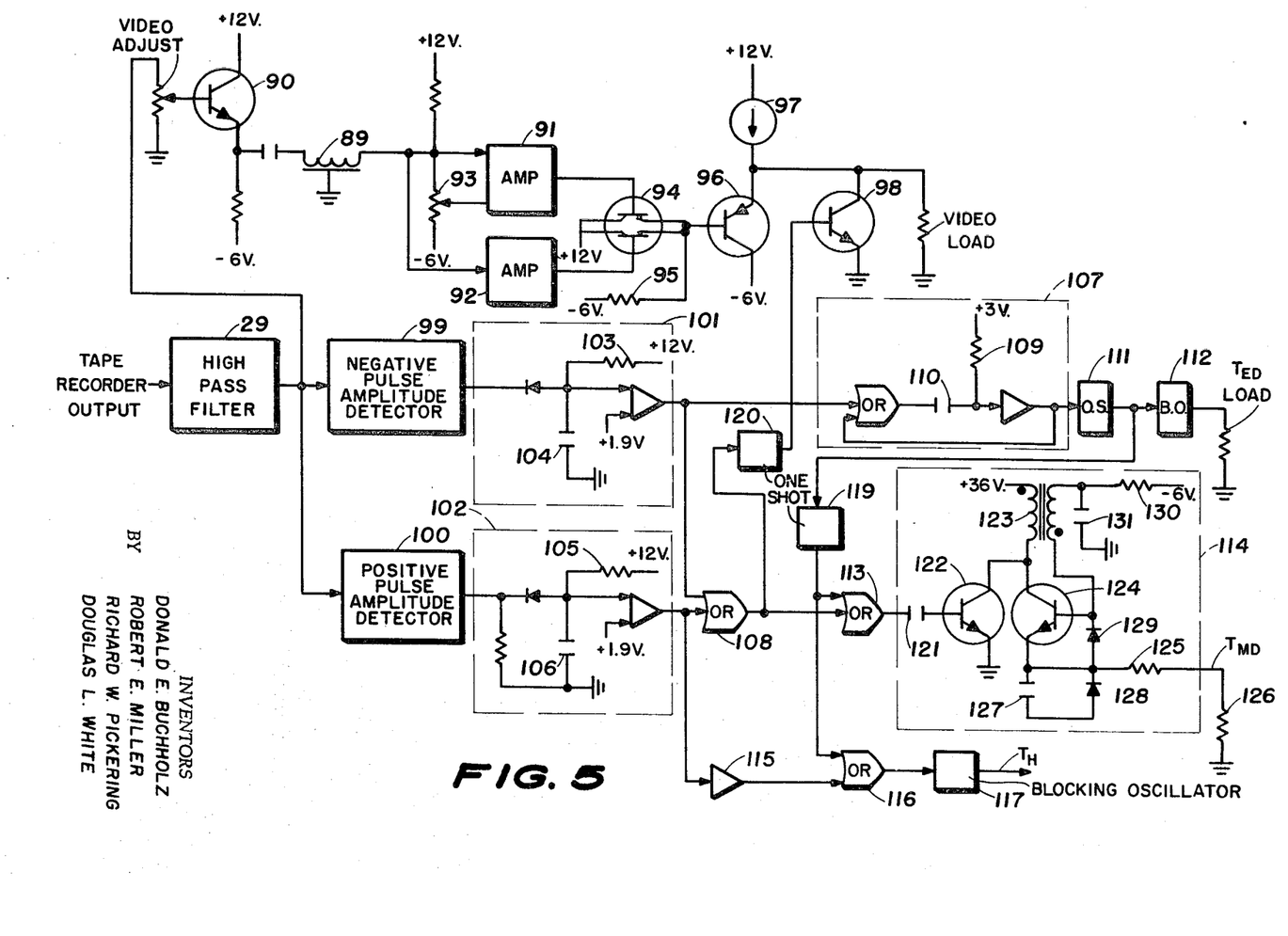
FIG. 5 is a schematic diagram of the output electronics module.

The output electronics module, shown in schematic form in FIG. 5, removes the low-frequency noise from the recorder output, detects and reconstructs synchronizing triggers, and detects the modulated video.

Since the video information is contained in the amplitude of the composite signal, detection is effected by full-wave rectification. However, the modulated video is delayed 1 microsecond before rectification to provide time correlation between the video and the synchronizing trigger outputs which require 1 microsecond for detection and regeneration. After detection, the video is blanked during synchronizing pulse durations to remove the rectified triggers. Referring now to FIG. 5, the 1 microsecond delay line 89 is driven by emitter follower 90. The output of the delay line is fed in parallel to amplifiers 91 and 92. To ensure that the positive-going signal from each of the amplifiers is equal after detection, an offset potentiometer 93 is provided. The potentiometer is connected to the noninverted input of amplifier 91. Adjustment of resistor 93 can change the DC output of amplifier 91 which can adequately compensate for amplifier and detector offsets.

Video detection is accomplished by a matched pair of transistors 94 packaged in a single can and connected as emitter followers. When one base of one transistor swings above ground, the other base swings below ground and thus only one emitter follower is turned on at a time, producing positive detected video across resistor 95.

The video detector output is coupled to the load by emitter follower 96. For minimum attenuation and power dissipation, transistor 96 is biased by a constant current generator 97. When a synchronizing trigger is detected by the pulse detection circuitry, transistor 98 is turned on, thus diverting current generator 97 current to ground.

TRIGGER DETECTION

The detection of a recorded synchronizing trigger is based on the criteria that the voltage will be greater than a specified value for a specified time duration. Thus a first requirement would be to preclude tape recorder noise from generating a trigger, and a second requirement is to prevent the modulated video from generating a trigger. The logic used in reconstructing the triggers is that the first negative trigger detected is the early synchronizing pulse and that it will recur in a specified time interval. After the early synchronizing pulse, no triggers can be regenerated except during a specified time interval after the regenerated early synchronizing trigger. If during this interval, or "window," a positive trigger is detected, both a horizon trigger and a master trigger are generated; if a negative trigger is detected only a master trigger is generated.

Again referring to FIG. 5, two integrated voltage comparators are used as pulse amplitude detectors 99 and 100. 100 sets the positive threshold, while amplitude 99 sets the threshold for negative inputs.

Identical pulse width detectors 101 and 102 are employed, following the amplitude detectors 99 and 100. This principle of operation is based on the conversion of pulse duration to amplitude, using a ramp generator, and then comparing the amplitude to a threshold voltage. The ramp generators are composed of resistor 103 in connection with capacitor 104 and resistor 105 in connection with resistor 106.

The output of negative pulse width detector 101 is fed in parallel to multivibrator 107 and gating function 108. Multivibrator 107 is connected as a monostable multivibrator with its timing set by capacitor 110 and resistor 109. This multivibrator, as well as all the multivibrators in this module, operates such that the output timing is the duration of the high-voltage level and is initiated by a low-to-high voltage transition on the input. When multivibrator 107 is initiated, multivibrator 111 is triggered which in turn provides the trigger for the early trigger pulse blocking oscillator 112 and initiates the "window" for accepting a detected pulse during a specified time interval later. No feedback is required in multivibrator 111 since the input pulse duration is longer than the output pulse duration. The other path for detector 101 output is through OR-gate 108. When the input to OR-gate 108 goes to the higher voltage level, the output is switched to the low-voltage state. When this low state exists during the "window" generated by the early synchronizing pulses, both inputs to gating function 113 are low and the output of said OR-gating function 113 triggers the master synchronizing pulse blocking oscillator 114. The pulse output of positive pulse width detector 102 is inverted by amplifier 115 and appears at OR-gating function 116 as a low-voltage state. When this exists during the "window" time, OR-gating function 116 output goes high and triggers the horizon synchronizing pulse blocking oscillator 117, thus producing the horizon synchronizing pulses. In addition, positive pulse width detector 102 output is fed to OR-gating function 108 where its effect is the same as a detected master synchronizing pulse trigger. The "window" for gates 116 and 113 is generated by delaying the leading edge of a regenerated early synchronizing trigger pulse at specified time intervals before triggering monostable multivibrator 119. Blanking the synchronizing triggers which would appear otherwise on the detected video is done by sensing the output of the gating function 108. Any time gating function 108 goes low, a trigger pulse has been detected and will appear on the output video. Therefore, monostable multivibrator 120 is triggered to provide the base drive for transistor 98 which diverts the video output current to ground. The period of the multivibrator is chosen to blank the widest expected synchronizing trigger.

As the three blocking oscillators 112, 114 and 117 are identical, only one, the master synchronizing pulse oscillator 114, will be described. The positive voltage transition at gating function 113 is coupled through capacitor 121 to turn transistor 122 on. This causes a negative voltage transition at the collector of transistor 122, which when coupled through inductor 123 to the base of transistor 124, is regenerated by the gain of transistor 124. Transistor 124 quickly saturates and its emitter voltage becomes five times the primary voltage of inductor 123. This is divided down by resistor 125 and the load impedance 126 to give a peak output of a specified value. The duration of the output pulse is determined by the time required for transistor 124 collector current to increase beyond the value which can be supported by the base current. This in turn is determined by the pulse transformer inductance. The function of capacitor 127 is to improve the output rise time. Resistor 125 is a current-limiting resistor for preventing destruction of transistor 124 when the output is shorted to ground. Bias for the transistor 124 base and emitter is provided through diodes 128 and 129 and resistor 130 to the −6-volt supply. This method allows the energy stored in induc- 123 to be dissipated through diodes 128 and 129 and acitor 131 without breakdown of transistor 124 or freening operation. Another function of the bias network is to vent triggering of the blocking oscillator by pickup on the put lead.

ANTENNA POSITION PROCESSING here are several types of signal formats used to transmit enna position information from a search radar to a display isole. The two main groups of information formats are ital and analog. Although the subject radar video recording tem is designed to record the analog signal formats, it could ily be modified by one skilled in the art to accommodate ital formats. In the analog group the target position can be ined by either rectangular coordinates or polar coorates. The capability to record either form is provided in the iject radar video recording system.

Rectangular coordinate data is provided as two scalar volts whose relative amplitudes and polarity define a point on a ne surface east or west and north or south of the radar anna. The amplitude of each signal denotes the distance on h axis in proportion to the maximum range of the radar set. e direction is noted by the ratio of one to the other.

A similar signal can be used to define the elevation angle of radar antenna or beam. This scalar voltage is based upon maximum radar range and the sine of the elevation angle.

Polar coordinate data are transmitted by three AC synchro tages. The synchro signal amplitude and phase uniquely ine a given angular position.

The scalar voltages are used when the movement of the anna beam is so rapid that the synchro systems are too slow to curately reproduce the position information. In the subject lar video recording system, the scalar voltages are attenud and used to frequency modulate voltage control oscillas 21 as shown in FIG. 2. The high-frequency voltage control illators are used for the highest data rates. As the data rate reases, the carrier frequencies are reduced. Many frequens may be multiplexed together and recorded therein on the ne track of a tape recorder.

The synchro transmission system requires five AC signal es to define spatial antenna position. Three of the five lines : stator voltages and two are reference voltages. The amtude of each stator voltage relative to the others, and their ase relative to the reference voltage, combine to define the gular position of the synchro rotor. Due to the limited mber of voltage-controlled oscillators available, special cessing is used to reduce the number of signals necessary define the rotor position. This is accomplished by converting the three stator voltages to a constant amplitude signal ose phase relative to the reference voltage varies as the sition of the synchro rotor. The phase variable signal and : reference voltage frequency modulate two voltage-conlled oscillators prior to being recorded. On playback, refering again to FIG. 2, these two signals are recovered by disminators 34 and fed to drive servo units 37. The servo units generate a shaft position as defined by the relative phase gle between those two signals. This shaft then defines a nsmitting synchro which is then used to drive the indicas.

Figure 6:
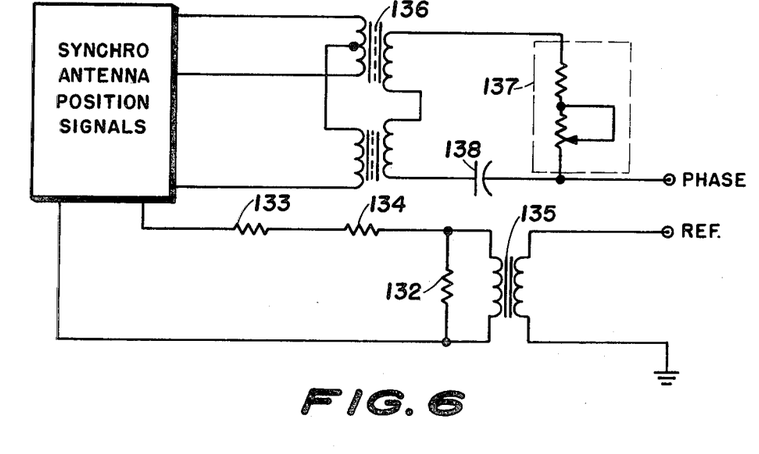
FIG. 6 is a schematic diagram of the synchro isolation unit.

Referring now to FIG. 6, there is depicted a schematic diam of the synchro isolation module which provides two ntical channels for converting five-wire synchro informan into a reference signal and a phase-modulated carrier ich, in turn, are suitable for modulating the voltage-conlled oscillators. The reference voltage is obtained from the ichro rotor supply by a divider network consisting of retors 132, 133 and 134 and step-up transformer 135. The ase-modulated signal is obtained through two transformans. The first is the transformation of the three stator voltes into two suppressed carriers in quadrature with respect to synchro shaft angle. The signal voltages are obtained from o independent transformers packaged in a single case and referenced on the schematic as 136. These transformers are connected in the well-known "Scott-Tee" combination. The second transformation is the summation of the two suppressed carriers in a 90° RC phase shifter comprising resistor 137 and capacitor 138 to form a constant amplitude, phase-modulated carrier. A critical consideration in the transformation is that the phase shift be 90°, and for this reason the resistance is variable to compensate for capacitor tolerance and synchro source frequency variations.

The function of the voltage-controlled oscillators 21 of FIG. 2 is to generate frequencies which deviate linearly in response to the applied input voltages. The voltage-controlled oscillators of the subject invention receive the modified synchro antenna position information, the scalar antenna position information, and voice and other control information and converts all of said information into respective frequency components.

The fidelity of FM data reproduced from magnetic tape is a function of, among other factors, the stability of the tape transport speed both in the record and reproduce cycles. Relatively high-frequency variations in tape speed produce what is termed "flutter" in the output signals. The reference oscillator 23 of FIG. 2 provides a constant frequency reference signal for the flutter compensation scheme which will be discussed in greater detail hereinafter. This reference oscillator is of the standard crystal oscillator type generally known to those skilled in the art and therein will not be discussed in detail.

Figure 7:
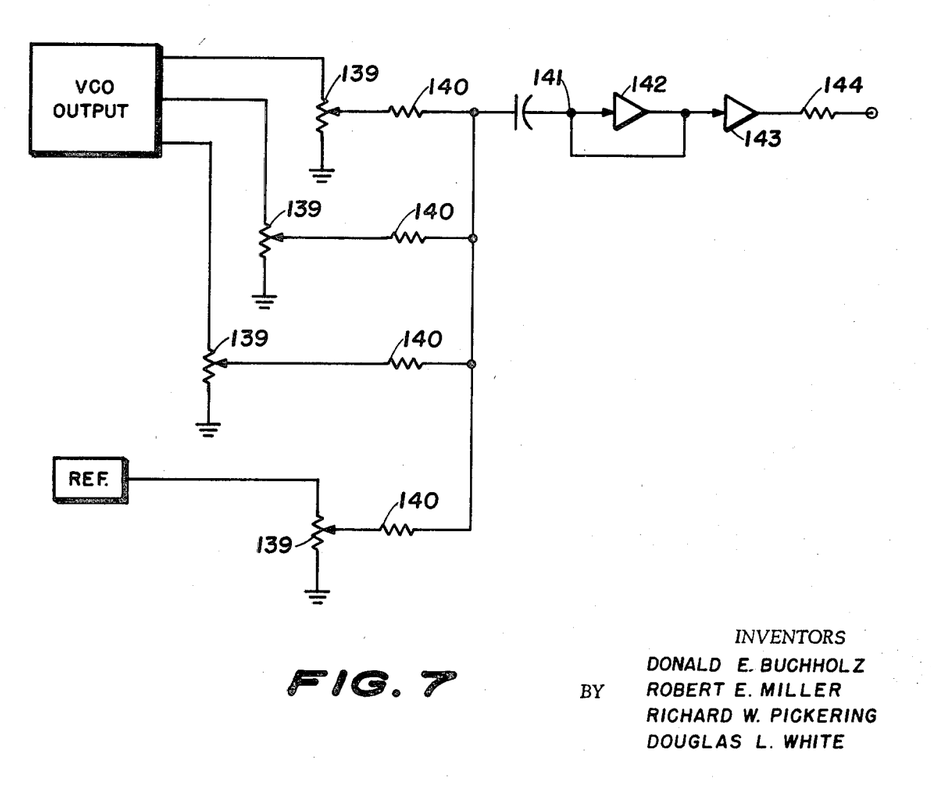
FIG. 7 is a simplified schematic of the summing amplifier.

Referring now to FIG. 7, there is illustrated a simplified block diagram of the summing amplifier which serves to combine the outputs of the voltage-controlled oscillators and the reference oscillator to form an amplified composite signal. The FM signals are tapped off the potentiometers 139 at the desired levels and are applied through input resistors 140 to the input-summing node 141. The resultant composite signal is applied to the voltage amplifier 142 which compensates for the signal loss in the input-summing network. Negative feedback is applied to input-summing node 141 to provide greater stability of voltage amplifier 142. Power amplifier 143 consists basically of an emitter-follower network in conjunction with a constant current source. The output impedance is selected by the value of resistor 144. The output of summing amplifier 24 is therein applied to one track 26 of a multiple track tape recorder 4.

Figure 8:
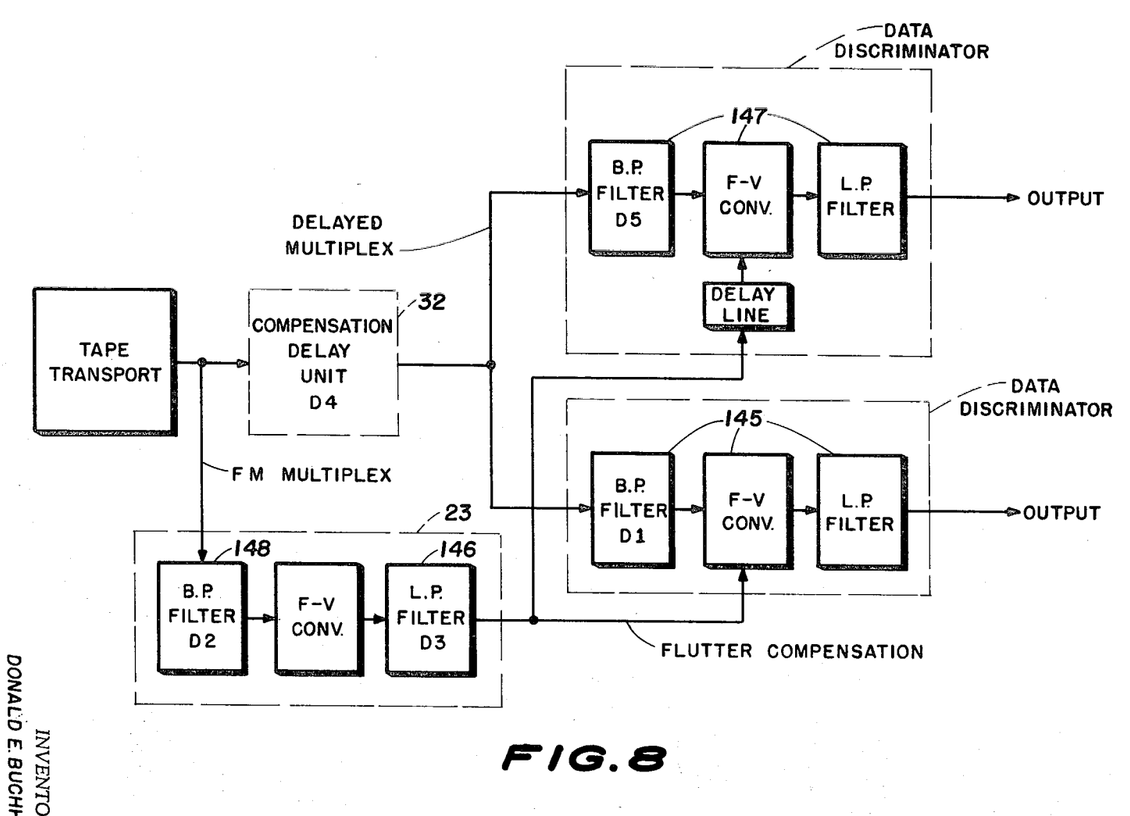
FIG. 8 is a block diagram depicting the flutter compensation means utilized in the instant invention.

Following playback of said FM track 26, the inherent data is obtained by the use of data discriminators 34. However, in intermediate said playback and discrimination operations there is involved a method for reducing the amount of flutter. Flutter is the term used to describe the result of short term tape speed variation from nominal. Flutter compensation is necessary in FM recording systems because tape speed variations directly modulate the subcarrier frequencies. The effect of flutter is reduced by recording a constant frequency reference signal on the tape along with the subcarriers. In the reproduce systems, the frequency deviations of the reference signal (deviations produced entirely by tape flutter) are frequency-to-voltage converted by a discriminator called the reference discriminator 23, as shown in FIG. 8. The voltage representation of tape flutter is used to offset the center operating point of the data discriminator frequency-to-voltage converters in a direction opposite and equal to the offset produced by the flutter in the data signal. FIG. 8 illustrates the scheme used for flutter delay compensation involving insertion of a delay line in series with the data channels. In the constant bandwidth system 145, the delay line is chosen to match the delay in the reference discriminator low-pass filter 146. In the proportional bandwidth system 147, a delay line in the data band-pass filter and the delay line is matched to the total delay of the reference discriminator.

In FM data acquisitions systems, a constant frequency pilot or reference signal is usually multiplexed with the number of information channels to form the composite signal that is recorded on each tape track. The difference between the record speed variations and reproduce speed variations produce contractions and expansions in the composite signal resulting in distortion of the information. This distortion is the only modulation of the pilot or reference signal and therefore can easily be extracted and converted to a DC voltage by a tuned reference discriminator. The DC voltage can then be used to control the reference frequency of the data discriminators, thus eliminating flutter in their outputs. Thus, data discriminators of FIG. 8, have tuned input and output filters with an inherent delay in each. The flutter compensation signal is delayed by the reference discriminator input 148 and output 146 filters but is introduced to the data discriminators at a point where the multiplexed signals have been delayed only by the input filters. The additional delay of the flutter compensation signal is offset by the compensation delay unit 32; said compensation delay unit amplifies the multiplexed signal from the selected reproduce amplifier of tape recorder 4 and provides an undelayed output to the reference discriminator 23 and a delayed output to the data discriminators. The two signals then occur in correct time in said data discriminators. The gain of the compensation delay unit 32 can be varied to provide the correct drive level to the discriminators for a wide range of input signal levels.

Figure 9:
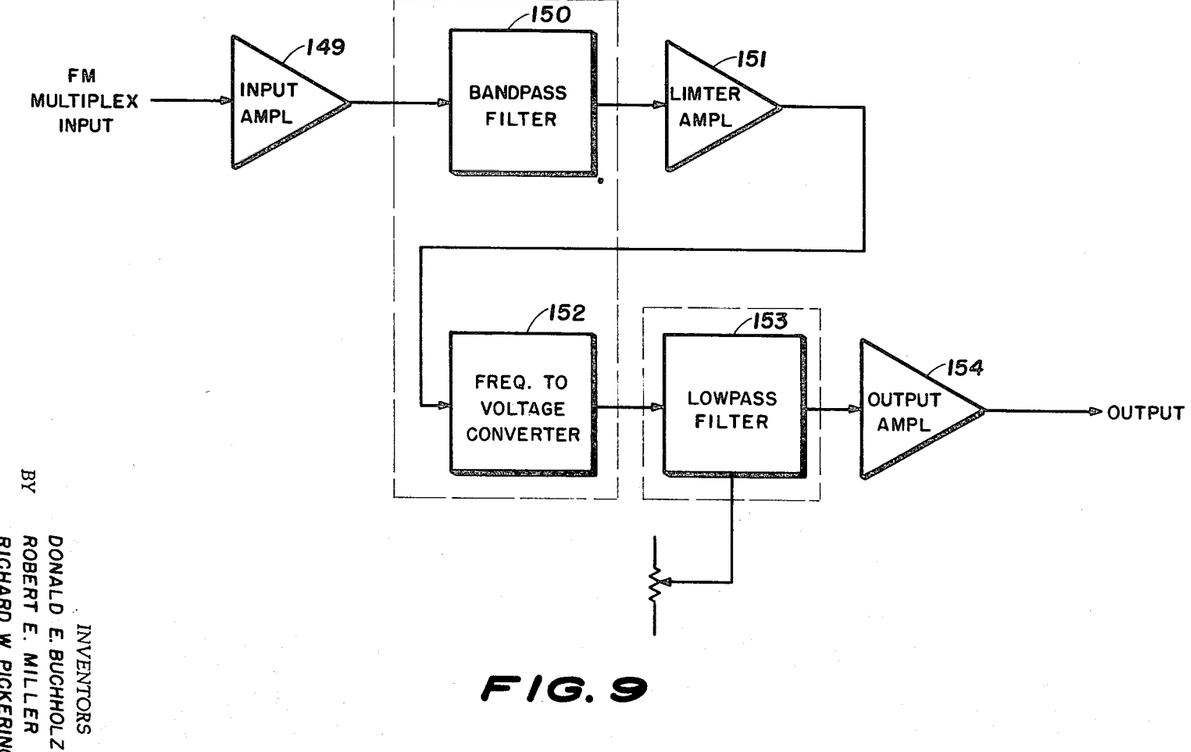
FIG. 9 is a block diagram of the data discriminators.

Referring now to FIG. 9 there is shown the general signal flow that the data discriminators utilize to convert frequency to voltage. In the FM detection system the entire multiplexed carrier is first amplified by amplifier 149 and then the particular data channel is separated from the multiplex by one of a plurality of band-pass filters 150. The subcarrier and its deviation are then amplitude limited by amplifier 151 to remove the amplitude modulation effects of FM noise. The output of amplifier 151 is frequency-to-voltage converted by one of a plurality of converters 152 and then fed through the appropriate low-pass filter 153 to remove the subcarrier frequency components. The variable output amplifier 154 permits amplitude scaling of the output signal in proportion to the original data.

Thus, from the output of the respective data discriminators are reproduced the original information such as scalar antenna position information and the voice code information, etc. However, to reproduce the synchro antenna position information, additional processing must be accomplished.

The drive servos 37 of FIG. 2 contain the components which reproduce the synchro antenna position information of the radar antenna in the form of a five-wire synchro signal. The inputs to each servo consist of a reference signal and a phase-modulated signal, these signals coming from the respective data discriminators. The output element in each drive servo is a synchro generator which is capable of driving many plan position indicator repeaters.

The servo-driven synchro in the drive servo circuitry reproduces radar antenna angular position with a maximum error of one degree at rotation rates up to 16 r.p.m. This is accomplished by means of a type two servomechanism which is familiar to those skilled in the art and which has two integrations in its closed loop transfer function. The integrations are performed by an operational amplifier and by a DC torque motor, as will be explained in detail hereinafter.

The radar antenna angular position $\theta_s$, is represented by the phase of a 60 Hz. signal at the input to the driven servo:

$e_1 = K_1 \sin(wt + 45° - \theta_s)$.

This signal and a 60 Hz. reference, $K \sin wt$, are generated in the synchro isolation module 20 of FIG. 2 and are fed to the drive servo by a voltage-controlled oscillators 21, video tape recorder 4, and data discriminators 34.

Figure 10:
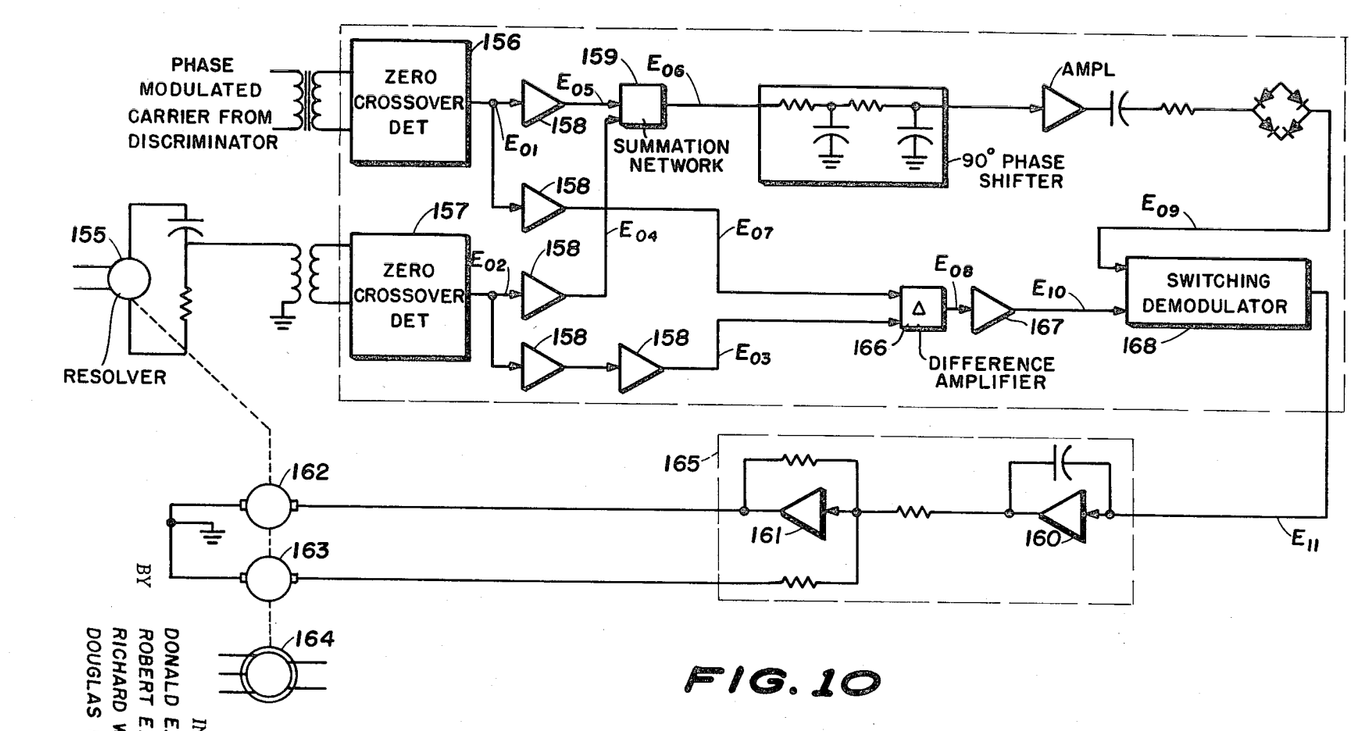
FIG. 10 is a functional block diagram of the drive servo circuitry.

Referring now to FIG. 10, the reference signal is connected to resolver 155 which has a shaft angle $\theta_o$, equal to the servo output. This resolver, in conjunction with the phase shift components, produced an output:

$e_2 = K_2 \sin(wt + 45° - \theta_o)$ which is of exactly the same form as $e_1$. The feedback in the servo loop causes the condition $e_1 = e_2$ to exist and, thereby, causes $\theta_o = \theta_s$.

Figure 11:
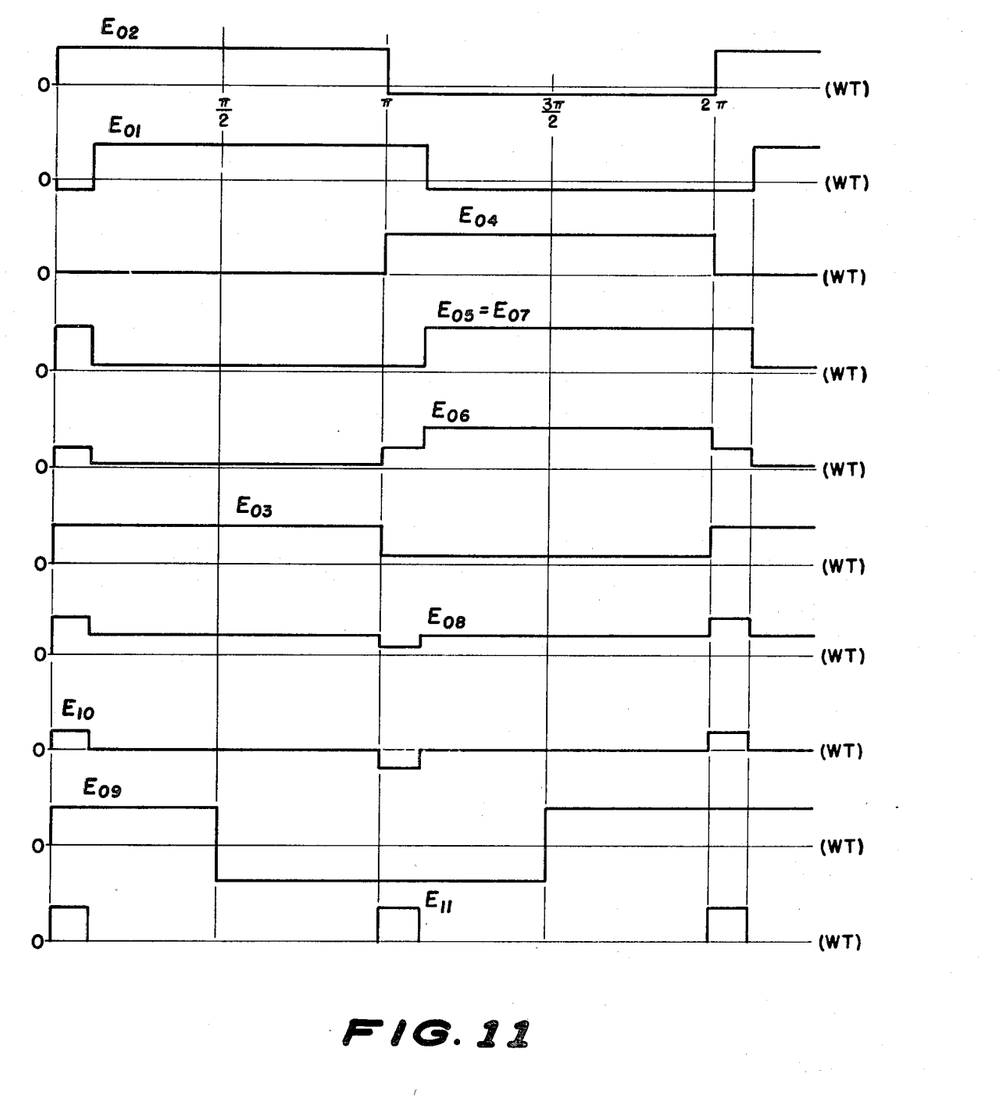
FIG. 11 illustrates the signal processing waveforms utilized in the drive servo circuitry.

The signal flow within the drive servo is initiated by processing sine waves $e_1$ and $e_2$ through zero crossover detectors 156 and 157 of FIG. 10 to form square waves $E_{01}$ and $E_{02}$ respectively of FIG. 11. These square waves are standardized in height and appropriately conditioned by inverters 158 to form the signals:

$E_{05} = E_{07} = -E_{01}$
$E_{04} = -E_{03} = -E_{02}$

Summation network 159 produced the signals:

$E_{06} = -(E_{01} + E_{02})$
$E_{08} = -(E_{01} - E_{02})$

The $E_{06}$ signal is phase shifted by 90° and is used to control integrator 160 which generates a switching square wave $E_{09}$. $E_{09}$ is a bipolar square wave timed so that the center of each half-cycle coincides with the error pulses $E_{0R}$ as produced by difference amplifier 166. Error pulse output $E_{0R}$ is then applied to a zero DC level adjust amplifier 167 which produces output signal $E_{10}$. The demodulator 168 detects the sense and magnitude of $E_{10}$ and produces an error output $E_{11}$ which has a standard amplitude and a width proportional to the servo error $e_1 - e_2$. The sign of $E_{11}$ depends on the direction of the error. On the servo driver board 165, $E_{11}$ is integrated by amplifier 160 and then fed to servomotor power amplifier 161. The integrated output amplitude is proportional to the input ($E_{11}$) pulse width. The servomotor power amplifier 161 drives DC torque motor 162 directly. Negative rate feedback for loop stabilization is derived from tachometer 163 which is actually a part of the motor unit. The motor shaft is directly coupled to resolver 155 and to output synchro generator 164.

Accordingly, a new and unique method and associated apparatus for recording and reproducing video and other related data from two and/or three-dimensional radar sets are provided by this invention.

We claim:

1. A radar data recording system for recording radar video, synchronizing pulses and antenna position signals from a radar set, comprising,
   means for modulating said radar video signal;
   summing means to combine said modulated radar video signal with said synchronizing pulses to form a radar composite signal;
   isolating means to provide impedance compatibility with the output of said radar set and the input of said modulating and summing means;
   means for processing the antenna position signals to form an antenna position composite signal;
   recording means adapted to severally record said radar composite signal and said antenna position composite signals; and
   means operably connected to said recording means for detecting said antenna position composite signal and said radar composite signal to reconstruct each of said antenna position signals, said radar video, and said synchronizing pulses upon playback of said recording means.

2. The radar data recording system as claimed in claim 1, wherein said isolating means utilized in forming said radar composite signal from said radar video and synchronizing signals comprises radar video and synchronizing pulse isolators operably connected to receive said radar video and said synchronizing pulses whereby radar loading is prevented.

3. The radar data recording system as claimed in claim 1, wherein said processing and summing means utilized in forming a radar composite signal from said radar video and said synchronizing signals comprises
   a fixed baseline amplifier operably connected to the output of said radar video isolator to remove any slow voltage variations in the radar video baseline,
   a chopper modulator serially connected to the output of said fixed baseline amplifier to chop the radar video at a predetermined frequency rate,
   logic gating circuits serially connected to the outputs of said synchronizing pulse isolators for insuring a minimum voltage baseline of said synchronizing pulses, and
   a summing network for adding the modulated video received from the output of said chopper modulator and synchronizing pulses received from said logic gating circuit, the output of said summing network constituting said radar composite signal.

4. The radar data recording system as claimed in claim 3, wherein said reconstructing means for deriving said antenna position signals from said FM antenna position composite signal upon playback of said recording means comprises, frequency-modulated data discriminator means operably connected to said recording means to produce first and second outputs, said first output representing said scalar antenna position signals and said second output representing modulated synchro antenna position signals, and a drive servo means serially connected to said second output of said frequency-modulated data discriminators to reproduce said synchro antenna position signal.

5. The radar data recording system as claimed in claim 4, wherein said frequency-modulated data discriminator means comprises, in series, an input for receiving said FM antenna position composite signal,
an input amplifier,
a band-pass filter wherein the desired subcarrier is removed,
a limiting amplifier for removing the amplitude modulation effects of frequency modulation noise of said subcarrier and its deviation,
a frequency-to-voltage converter,
a low-pass filter wherein said subcarrier frequency components are removed,
an output amplifier wherein amplitude scaling of the output signal proportional to the original data is accomplished,
first and second outputs wherein said first output represents said scalar antenna position signal and said second output represents a modulated synchro antenna position signal, and
means for obtaining said synchro antenna information.

6. The radar data recording system as claimed in claim 5, wherein said modulated synchro antenna position signal comprises a phase-modulated carrier and a reference signal.

7. The radar data recording system as claimed in claim 6, wherein said drive servo means comprises transformer circuit means for receiving said phase-modulated signal from said second output of said FM data discriminator,
resolver circuit means for receiving said reference signal from said second output of said FM data discriminator,
means to process said phase-modulated carrier and said reference signal into a pulse train whose pulse width corresponds to an error between the resolver shaft position and the radar antenna synchro position,
a DC torque motor, and
means serially connected to the output of said signal-processing means for converting said pulse train into power for driving said DC torque motor for turning said resolver until the error between said resolver shaft position and the radar antenna synchro position is nil.

8. The radar data recording system as recited in claim 1, wherein said antenna position signals comprise synchronous antenna position signals which relate to polar coordinate antenna position data and scalar antenna position signals which relate to rectangular coordinate antenna position data.

9. The radar data recording system as cited in claim 8, wherein said processing means to form an antenna position composite signal from said antenna position signals comprises
converting means to transform said synchro antenna position signals and said scalar antenna position signals into a plurality of frequency-modulated signals,
summing means for multiplexing said plurality of frequency-modulation signals, and
conditioning means to provide compatibility of said synchro antenna position information with said converting means.

10. The radar data recording system as claimed in claim 9, wherein said conditioning means comprises a synchronous ation module wherein said synchronous antenna position signals are transformed into a reference signal and a phase-modulated signal.

11. The radar data recording system as recited in claim 9, wherein said converting means comprises a plurality of voltage-controlled oscillators for producing an output frequency proportional to the input voltage magnitude.

12. The radar data recording system as recited in claim 11, wherein said phase-modulated signal modulates the operating region of said voltage-controlled oscillators.

13. The radar data recording system as claimed in claim 9, wherein said summing means consists of a summing amplifier which converts the outputs of said plurality of voltage-controlled oscillators into an FM antenna position composite signal.

14. The radar data recording system as claimed in claim 1, wherein said means for detecting and reconstructing said radar video and said synchronizing pulses comprises
video detection means serially connected to the output of said recording means for recovering said radar video, and
serially connected pulse amplitude and pulse width detectors,
said detectors being connected in electrical parallelism with the input of said video detection means to reconstruct said synchronizing pulses.

15. The radar data recording system as claimed in claim 14, further comprising a high-pass filter intermediate said recording means and said input means for detecting and reconstructing said radar video and said synchronizing pulses, whereby said high-pass filter serves to remove low-frequency noise that would interfere with said synchronizing pulse detection.

16. The radar data recording system as recited in claim 1, wherein, tape flutter correcting means is provided intermediate said recording means and said reproducing means for deriving said antenna position signal.

17. In a radar set having outputs of video synchronizing pulses and angular position information, said angular position information further consisting of synchro antenna position information and scalar antenna position information, a method of recording the radar outputs comprising the steps of
modulating said video data on a higher frequency carrier,
combining said modulated video with said synchronizing pulses to form a radar composite signal,
recording said radar composite signal on a first track of a tape recorder,
combining said synchro antenna position and said scalar antenna position into a resultant FM antenna position composite signal,
recording said FM antenna position composite signal on a second track of said tape recorder,
detecting and reconstructing said synchronizing pulses upon replay of said first track and detecting said modulated video signal to remove the modulated carrier,
detecting said FM antenna position composite signal upon replay of said second track to reconstruct said scalar antenna position information and said reference and phase-modulated signals,
converting said phase-modulated signal and said reference signal into said synchro antenna position signal.

18. The method for radar data recording as recited in claim 17, further comprising the steps of,
converting the synchro antenna position information into a reference signal and a phase-modulated signal,
applying said reference signal and said phase-modulated signal along with said scalar antenna position information to a plurality of voltage-controlled oscillators whose output frequency is directly proportional to the input voltage, and
summing the frequency outputs of said plurality of voltage-controlled oscillators for producing a resultant FM antenna position composite signal.

19. The method for radar data recording as claimed in claim 17, further comprising, intermediate said replay from said first track and said video detection, the step of high-pass filtering the output of said first track for removing low-frequency noise.

20. The method for radar data recording as claimed in claim 17, further comprising, intermediate said replay of said second track and said FM multiplex detection, the step of correcting for tape flutter.

* * * * *